MULTIPLE-CIRCUIT CONNECTING DEVICE

Filed Oct. 29, 1962 2 Sheets-Sheet 1

INVENTORS
ERNEST L. DANIEL &
PETER NADOR
BY- Smart & Biggar.
ATTORNEYS.

MULTIPLE-CIRCUIT CONNECTING DEVICE

Filed Oct. 29, 1962 2 Sheets-Sheet 2

INVENTOR
ERNEST L. DANIEL &
PETER NADOR
BY- Smart & Biggar.
ATTORNEYS.

United States Patent Office 3,178,670
Patented Apr. 13, 1965

3,178,670
MULTIPLE-CIRCUIT CONNECTING DEVICE
Ernest L. Daniel, Ottawa, Ontario, and Peter Nador, Montreal, Quebec, Canada, assignors to Northern Electric Company Limited, Montreal, Quebec, Canada
Filed Oct. 29, 1962, Ser. No. 233,611
6 Claims. (Cl. 339—65)

This invention relates to a multiple-circuit connecting device having a plurality of spaced connectors for establishing collective electrical connection with a plurality of similarly spaced contact means particularly when some misalignment exists between one or more corersponding connectors and contact means.

Multiple-circuit connections are often necessary when electrical apparatus is inter-connected. One example is the connection of testing equipment to "cross-bar" switches in telephone switching apparatus. A cross-bar switch comprises an assembly of switch units having a plurality of relay-operated spring contacts. Each switch unit has separate test contact means to which the testing equipment may be connected. The switch units are arranged on the framework of the cross-bar switch with their test contact means in horizontal alignment across the face of the switch but spaced from each other. Previously, the testing equipment was connected to each switch unit of a cross-bar switch individually by test wires and individual connectors that were manually connected to the separate test contact means of the switch units. This method of establishing multiple-circuit connections was very inefficient, particularly in telephone offices having large numbers of cross-bar switches requiring periodic testing.

Electrical connecting devices are known for establishing collective electrical connection with a series of spaced contact means but they are limited to use with the particular series of contact means for which they have been specifically designed, or series identical thereto, so that virtually no misalignment exists between the connectors of the devices and their corresponding contact means. They cannot be used with a series wherein the spacing of the contact means varies from the spacing of the corresponding contact means in said particular series by more than that permitted by narrow manufacturing tolerances. These known devices, therefore, in a form for use with cross-bar switches, could not be used interchangeably with all like cross-bar switches, even though corresponding switch units and hence their test contact means are intended to have the same spacing from switch to switch, because the accuracy with which the switch units are mounted on the switch framework results in variations between the actual and intended spacings of the test contact means for which the known devices cannot compensate. This limitation of the known connecting devices applies, of course, in all applications where a connecting device is to be used with a series of contact means when considerable misalignment exists therebetween.

This invention is a multiple-circuit connecting device comprising a plurality of spaced connectors for establishing collective electrical connection with an equal number of spaced contact means wherein the connectors are individually resiliently mounted on a support member with adjacent connectors being separated by the intended spacing between corresponding adjacent contact means. A separate guide is attached to each connector and is adapted to engage a cooperating guide associated with the corresponding contact means before the electrical connections are established. The support member is movable firstly to engage all of the connector guides with their cooperating guides, thereby aligning each of the connectors with its respective contact means and subsequently to engage the aligned connectors with their corresponding contact means to establish the electrical connection collectively and accurately.

The connecting device of this invention can compensate for misalignment between the connectors and their corresponding contact means resulting from variations between the intended and actual spacings of the adjacent contact means. When the support member is moved to engage the guides with their cooperating guides, one or more guides will be engaged before the others if misalignment exists. Because of the resilient mounting of the connectors the support member can be moved further to engage the other guides while the first ones retain their respective connectors in alignment with their corresponding contact means. When all of the guide means are engaged, the support member is then moved to engage all of the corresponding connectors with the contact means in one movement.

A preferred embodiment of the invention is described below with reference to the attached drawings in which.

Figures 1, 2:
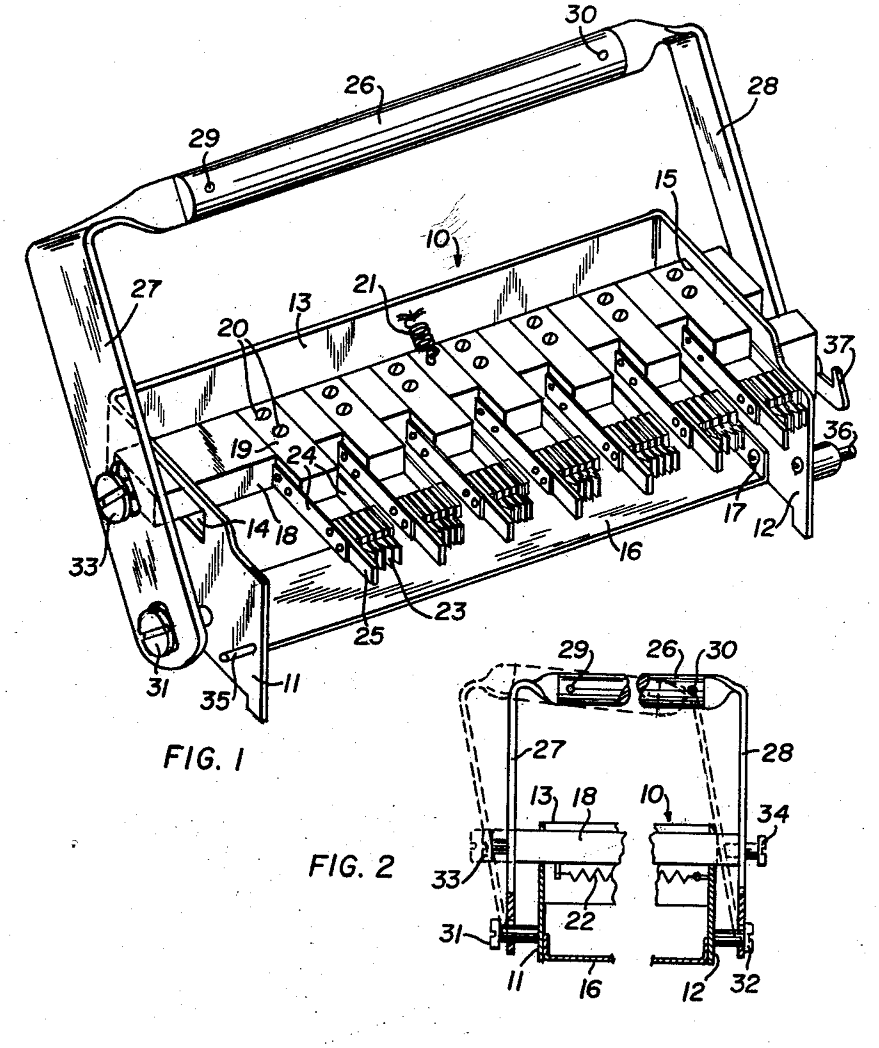
FIG. 1 is a front view in perspective of a multiple-circuit connecting device according to this invention.
FIG. 2 is a part-sectional front elevation of the connecting device with parts broken away for the sake of simplicity.

The multiple-circuit connecting device described hereinafter is a test fixture designed specifically for establishing electrical test connections with the test contact means of a telephone cross-bar switch. The test fixture, as shown in FIGS. 1 and 2, consists of a frame 10 with parallel spaced end plates 11 and 12 extending from a back plate 13 and having corresponding slots 14 and 15 adjacent their upper edges. A brace 16 extends between the end plates and is secured to the lower edges thereof by screws 17. A support member or bar 18 having a series of forwardly extending blocks 19 mounted at intervals therealong by screws 20 is slidably received in slots 14 and 15. The bar 18 is biased toward the rear of slots 14 and 15 by a spring 21 and toward end plate 12 by a spring 22 shown in FIG. 2. An electrical connector or test plug 23 is mounted on the forwardly extending end of each block 19 by a pair of parallel spring strips 24 and each test plug is provided with an electrically insulated guide tab 25.

The bar 18 is connected to an operating handle 26 through a pair of arms 27 and 28 pivotally connected to the handle at their upper ends by pins 29 and 30. The arms are universally connected to frame 10 at their lower ends by studs 31 and 32 mounted on end plates 11 and 12 respectively, each stud extending through an elongated slot in the end of its respective arm and having a head to retain the arm thereon. It will be apparent that the arms can pivot about the axis of studs 31, 32 and can also pivot to a limited extent, by virtue of the elongated slots, toward and away from a perpendicular relationship with said axis, the latter being clearly illustrated in FIG. 2. The arms 27 and 28 are similarly connected to opposite ends of the bar 18 intermediate their ends by similar studs 33 and 34. A movement of handle 26 displacing bar 18 to the left against the action of spring 22 is shown in FIG. 2. The handle 26 may also be pivoted forwardly about studs 31 and 32 to move bar 18 to the front of slots 14 and 15 against the action of spring 21.

Figure 3A:
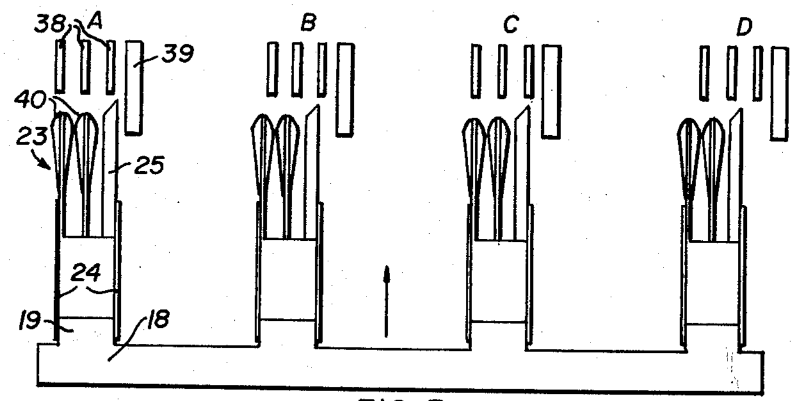
FIGS. 3*a*, 3*b* and 3*c* illustrate diagrammatically the operation of a connecting device similar to that shown in FIG. 1.

A pair of pins 35 and 36 and a catch 37 are provided on the forward edges of end plates 11 and 12 for mounting the test fixture on the framework of a cross-bar switch so that the test plugs 23 are located in approximate face-to-face relationship with the test contact means of the switch as is illustrated diagrammatically in FIG. 3*a*.

The test contact means at locations A, B, C and D in this figure each represent a switch unit and consist of several contact blades 38 and an associated guide tab 39 adapted to be engaged by and to cooperate with the guide tab 25 of the corresponding test plug 23. The test plug has spring contacts 40 of known design adapted to engage the contact blades 38 and establish an electrical test connection therewith. In other words, the test plug 23 is the mate of the contact formed by the blades 38. Both the guide tabs 25 and guide tabs 39 extend beyond the free ends of their associated spring contacts 40 and contact blades 38, respectively.

The test plugs 23 are spaced part along bar 18 by the intended spacing of the corresponding test contact means. The actual spacing of the test contact means, however, may and usually does differ from the intended spacing, which results in lateral misalignment between them and their respective test plugs 23. The contact means and test plug at D, for instance, are shown to have greater misalignment than those at A, B or C.

Figure 3B:
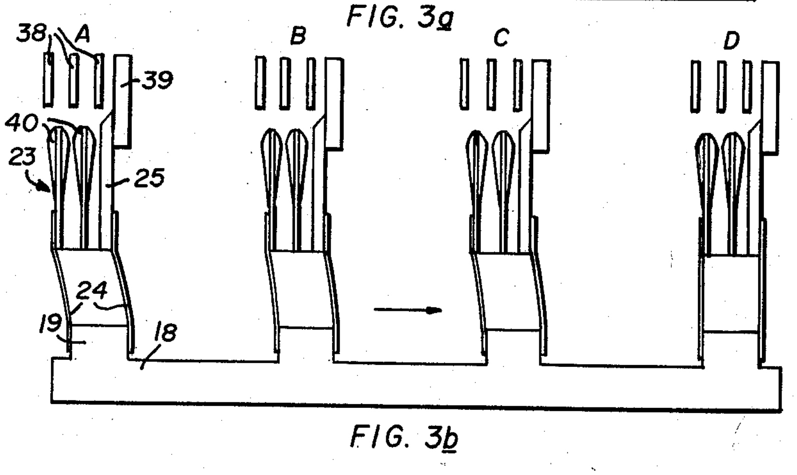

In FIG. 3*a* one movement of the handle 26 from its normal position shown in FIG. 1 has been made. The handle has been pivoted forwardly about the studs 31 and 32 to move the bar 18 in the direction of the arrow shown in FIG. 3*a* and against the action of spring 21 to position the free ends of guide tabs 25 in overlapping relationship with the free ends of the corresponding guide tabs 39. The electrical components of the test plugs 23 and the test contact means, however, have not yet been brought together. FIG. 3*b* shows the bar 18 displaced in the direction of the arrow shown in that figure by a lateral displacement of handle 26 against the action of spring 22 to bring each guide tab 25 into contact with its cooperating guide tab 39 and thereby align the corresponding test plugs 23 and test contact means. Because of the greater misalignment at D, the guide tabs at A, B and C are brought into contact first. Further movement of bar 18 to engage the guide tabs at D is permitted by the spring strips 24 which deflect to keep the test plugs 23 at A, B and C in alignment with their respective test contact means.

Figure 3C:
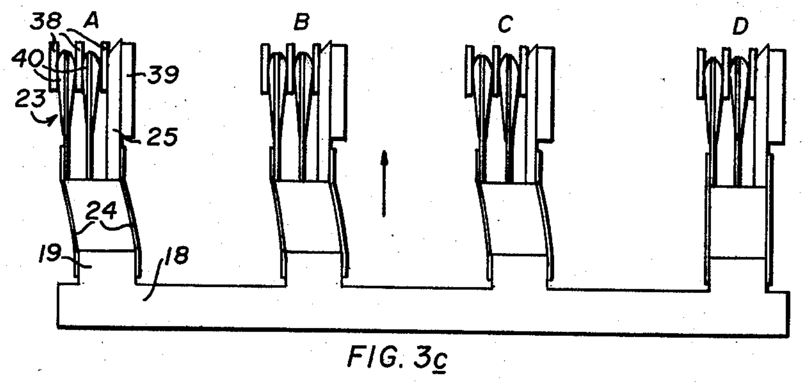

FIG. 3*c* illustrates the final step in the connecting operation, in which handle 26 is pivoted forwardly again, to engage all of the now aligned test plugs 23 and their corresponding test contact means in one movement. It is apparent that the spring strips 24, while being resilient in the lateral direction, must be sufficiently rigid in the direction of movement in FIG. 3*c* to overcome the resistance of wedging the strip contacts 40 between the contact blades 38. The wedging interengagement of contacts 40 and blades 38 holds the bar 18 in the position shown in FIG. 3*c* against the action of spring 21, the action of which tends to disengage the test plugs 23 from the test contact means. When the handle 26 is pivoted backwardly to cause disengagement, however, springs 21 and 22 coact on bar 18 to return it to the normal position shown in FIG. 1.

What I claim as my invention is:

1. A multiple-circuit connecting device for establishing collective electrical connection with a plurality of spaced contact means having individual guide means associated therewith and being arranged generally in side-by-side relationship, said device comprising separate connectors for engaging each of said contact means, a support member, means mounting the connectors individually on the support member with approximately the same spacing between adjacent connectors as between corresponding adjacent contact means, said means for mounting the connectors being resilient in the direction of said spacing, a frame for supporting the support member with the connectors in approximate face-to-face relationship with their respective contact means, means mounting the support member on the frame for movement in the direction of said spacing and in the direction of engagement of the connectors with said contact means, guide means attached to each connector and adapted to engage the guide means of the corresponding contact means by movement of the connectors in the direction of said spacing, and means connected to the support member and operable to move the latter in the direction of said spacing to engage the guide means and thereby align the connectors with their corresponding contact means due to the resiliency of the means mounting the connectors, said means connected to the support member being further operable to move the support member to engage the aligned connectors and contact means.

2. A device as claimed in claim 1 wherein said connector mounting means for each connector comprises a pair of parallel spring blades.

3. A device as claimed in claim 1 wherein said means for moving the support member is manually operable to move the member from a first position to a second position to overlap all of said guide means of the connectors with the corresponding cooperating guide means of said contact means, thence to a third position to engage the guide means and cooperating guide means whereby each of said connectors is aligned with its respective contact means, and finally to a fourth position to engage all of said connectors accurately and collectively with their respective contact means.

4. A device as claimed in claim 1 wherein the guide means of the connectors and the co-operating guide means of said contact means comprise two sets of tabs, the tabs of at least one set projecting forwardly for engagement with the other set before said electrical connection is established.

5. A device as claimed in claim 3, including spring means for normally retaining said support member in said first position.

6. A device as claimed in claim 3, wherein said manually actuable control means comprise a handle, two side arms pivotally connected at one of their ends to said handle, means mounting said side arms at their other ends on said frame for pivotal movement about an axis and for movement into and out of a perpendicular relationship with said axis, and means connecting said support member to said side arms intermediate their ends for movement with said side arms in response to manipulation of said handle.

References Cited by the Examiner

UNITED STATES PATENTS

| | | | |
|---|---|---|---|
| 2,295,367 | 9/42 | Sulzer | 339—150 |
| 2,594,748 | 4/52 | Earl | 339—66 |
| 2,744,968 | 5/56 | Blackhall | 339—75 |
| 2,770,788 | 11/56 | Eschner | 339—198 |
| 2,972,728 | 2/61 | Cole | 339—64 |

FOREIGN PATENTS

| | | |
|---|---|---|
| 625,388 | 6/49 | Great Britain. |

JOSEPH D. SEERS, *Primary Examiner.*